Figure 3:
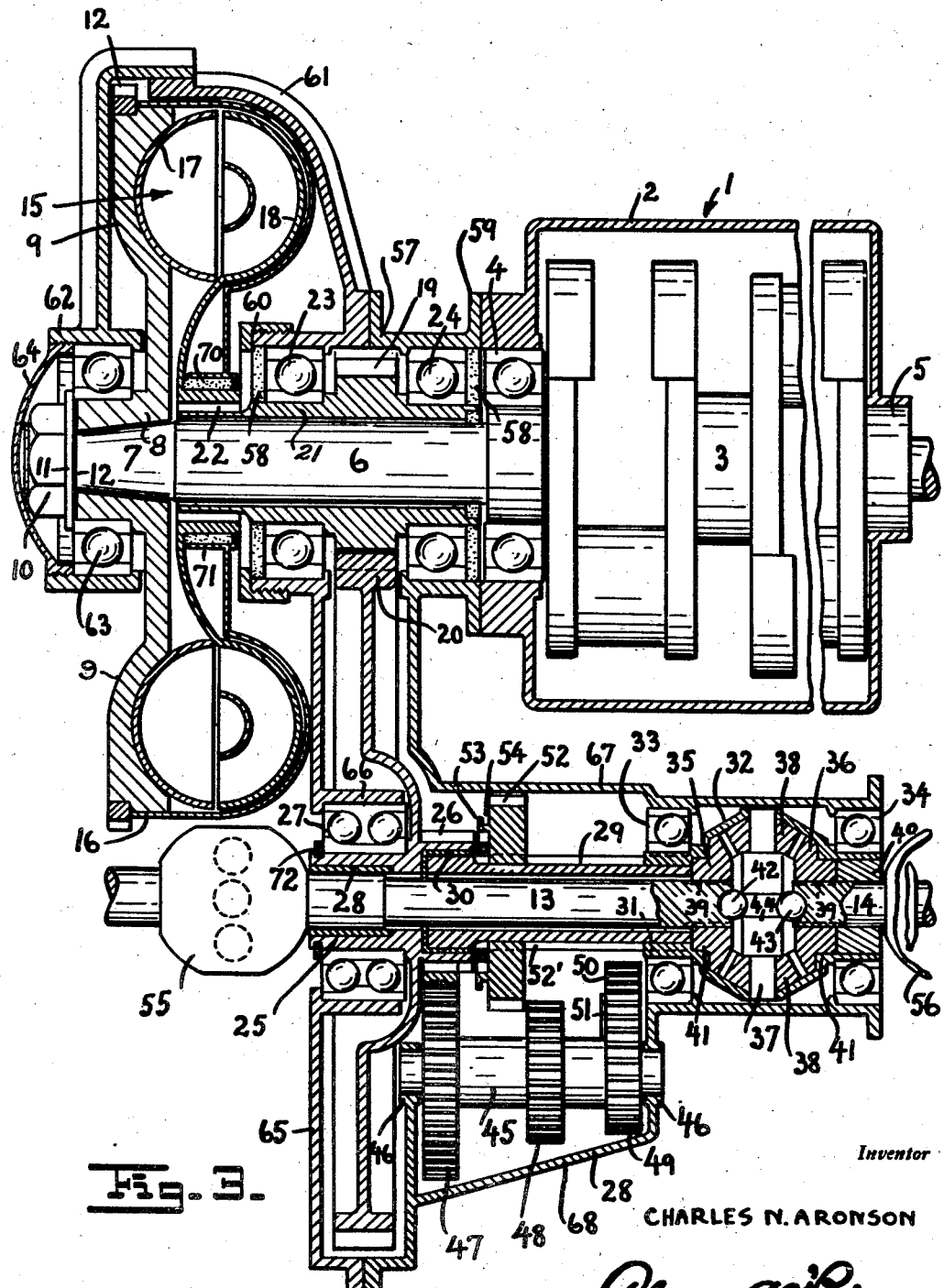

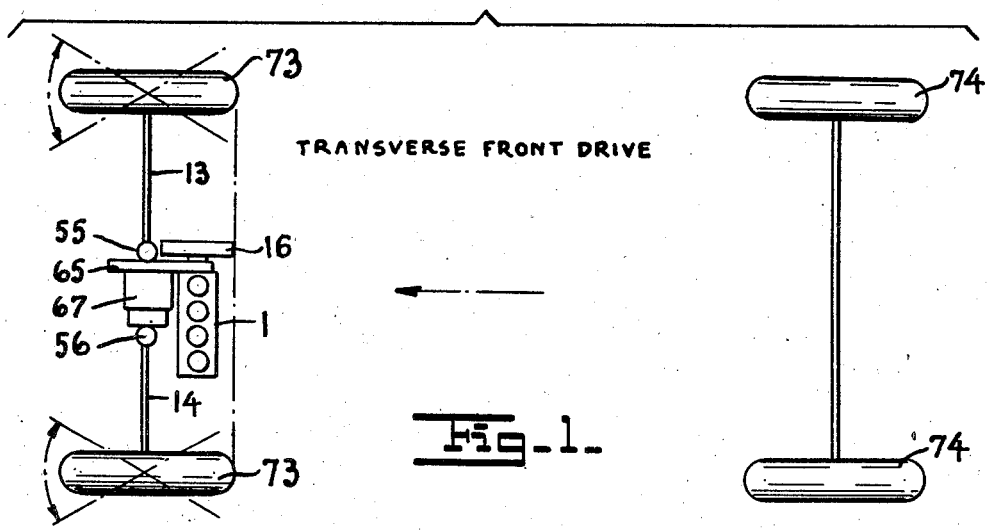
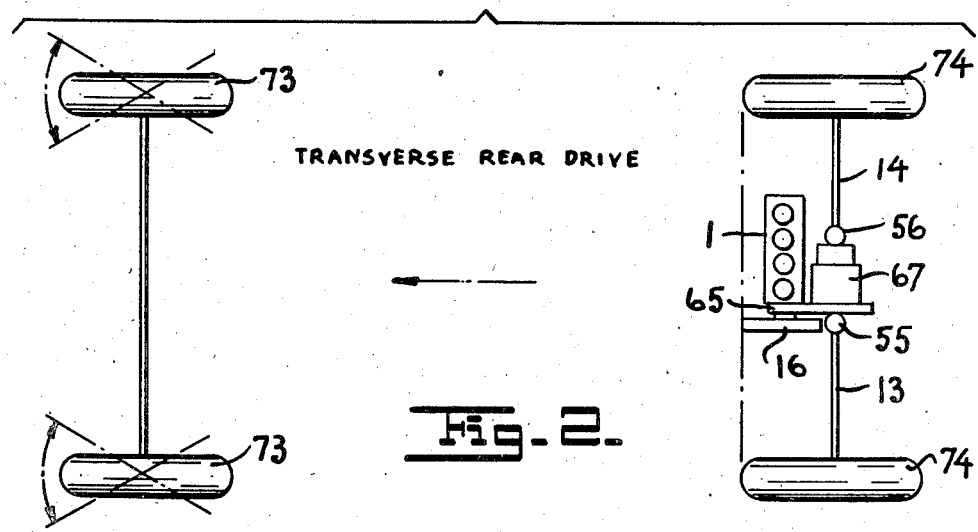

Aug. 31, 1948.   C. N. ARONSON   2,448,345
DRIVE FOR AUTOMOBILES AND THE LIKE
Filed Dec. 20, 1944   2 Sheets-Sheet 2

Inventor
CHARLES N. ARONSON
By
Attorneys

Patented Aug. 31, 1948

2,448,345

UNITED STATES PATENT OFFICE 2,448,345

DRIVE FOR AUTOMOBILES AND THE LIKE

Charles N. Aronson, Niagara Falls, N. Y.

Application December 20, 1944, Serial No. 569,028

3 Claims. (Cl. 180—70)

My invention relates to improvements in drives for automobiles, and other vehicles, and more particularly to so-called transverse drives in which the power shaft of a motor extends transversely of the vehicle.

Among the important objects of my invention are to provide a drive for either the front or rear wheels of an automobile, in which the number of operating parts is reduced to a minimum, the usual long propeller shaft, synchronous mesh gears, together with the usual unsprung rear axle and differential housing eliminated, as well as other complicating parts of conventional automobile drives, and the entire drive built into a compact, light weight, strong unit inexpensive to manufacture, install and service, and adapted for ready installation as either a front or rear wheel drive.

To the accomplishment of the above, and subordinate objects presently appearing, a preferred embodiment of my invention has been illustrated in the accompanying drawings, set forth in detail in the succeeding description and defined in the claims appended hereto.

In said drawings:

Figure 1 is a diagrammatic view in plan illustrating my improved drive applied to the front wheels of an automobile, Figure 2 is a similar view showing the drive applied to the rear wheels of an automobile, and Figure 3 is a detail view in horizontal section of the drive drawn to an enlarged scale.

Referring to the drawings by numerals, and more particularly to Figure 3, my improved drive, as shown, embodies a motor 1 of any suitable internal combustion type, preferably air-cooled, 2 designating the crankcase, 3 the crank shaft, and 4, 5 the front and rear end bearings for said crank shaft. Since the instant invention is not concerned with other details of the motor 1, the parts designated and shown are deemed sufficient to a proper understanding of the invention.

In accordance with my invention, the crank shaft 3 extends out of the crankcase 2 with a reduced front end 6 clear of said case 2 and terminating in a tapered section 7 upon which the internally tapered hub 8 of a disc-type, solid fly wheel 9 is wedged and secured by a nut 10 and a lock washer 11. The usual starter ring gear 12 surrounds the front edge of the fly wheel 9 and is suitably fixed thereto.

A particular feature of my invention is that the crank shaft 3 is arranged parallel to a pair of wheel-driving, axle-forming shafts 13, 14 arranged end to end and to which said crank shaft 3 is operatively connected as follows:

A fluid coupling 15 is provided alongside the fly wheel 9 in a fluid-containing casing 16 of which said fly wheel 9 forms the front side. The fluid coupling 15 is of the usual type embodying an impeller 17 and a driven runner 18 opposed side by side. In this instance, the impeller 17 is countersunk in the rear side of the fly wheel 9 for compactness in arrangement.

The runner 18 drives a reduction gear train comprising a relatively small gear 19 meshing with a larger gear 20. The gears 19, 20 may be of either the spur, or herringbone, type. The gear 19 is formed with an elongated hub 21 revolving around the front end 6 of the crank shaft 3 and to the front end of which said runner is keyed, as at 22. The hub 21 of the gear 19 is mounted at opposite sides of the mesh line of said gear in roller bearing units 23, 24 fixed in a drive housing, presently described in detail. The gear 20 has a tubular hub 25 on one side thereof revolving around the wheel-driving shaft 13, and a ring gear 26 on its other side. The hub 25 is rotatably mounted in a ball bearing unit 27 fixed in the beforementioned drive housing, in a manner presently clear. A bushing 28 in the hub 25 supports the wheel-driving shaft 13 intermediate the ends of said shaft.

A motion-transmitting, hollow shaft 29 is provided around the wheel-driving shaft 13 with a clearance between said shaft, one end of said shaft 29 being rotatably mounted in a cap bearing 30 fitted in the gear 26 and around said shaft 13. The other end of the motion-transmitting shaft 29 is keyed, as represented at 31, in one side of a differential casing 32 rotatably mounted at its opposite ends in ball bearing units 33, 34 fixed in the beforementioned drive housing to be described. The differential is of the usual type including a pair of opposed bevel gears 35, 36, a pinion-carrying spider 37 fixed in the casing 32, between said gears 35, 36 to revolve with said casing, and beveled gear pinions 38 on the spider 37 meshing with the gears 35, 36 for planetary operation. The wheel-driving shafts 13, 14 are keyed at the contiguous ends thereof, as at 39, in the gears 35, 36, the shaft 13, it will be seen, extending out of the motion transmitting shaft 29 into the gear 35, and the motion-transmitting shaft 14 extending through a radial bearing 40 in the casing 32. End thrust ball bearings 42, 43 are set into the contiguous ends of the wheel-driving shafts 13, 14 and into a groove 44 in the spider 37.

A variable speed transmission, of which the ring gear 26 forms a part, is provided between the gear 20 and the motion-transmitting shaft 29 as follows: At one side of said shaft 29, and parallel therewith, is a gear-carrying stub shaft 45 having its ends suitably journaled in bearings 46 formed in the beforementioned drive casing to be described. The stub shaft 45 has fast on one end thereof a gear 47 larger in diameter than the ring gear 26 and meshing constantly with the same. The gear 47 is narrower than said ring gear 26 and offset laterally relative thereto to leave one edge of said ring gear 26 clear. A low speed gear 48, relatively smaller than the gear 47, is fast on said shaft 45 intermediate the ends of the shaft, and a relatively smaller reversing gear 49 is fast on the other end of the shaft 45 and in constant mesh with a still smaller idler gear 50 suitably mounted on a fixed stud 51 between the gear 49 and said shaft 29. A shiftable gear 52 relatively larger than the low speed gear 48, and the ring gear 26, is splined, as at 52', on the motion-transmitting shaft 29 and is provided at one side thereof with a relatively smaller internal gear section 53 adapted to mesh with the clear edge of the ring gear 26. The gear section 53 is circumferentially grooved, as at 54, for coupling thereto the usual type of forked gear-shifting lever, not shown.

A universal joint 55 is provided in the wheel-driving shaft 13 adjacent the hub 25 of the gear 20, and a similar joint 56 in the wheel-driving shaft 14 adjacent the differential casing 32. The universal joints 55, 56 provide for flexibly mounting the wheel-driving shafts 13, 14 at the outboard sides of the joints.

The described drive parts are enclosed in a drive casing comprising a tubular, two-part section 57 surrounding the gear 19 and hub 21 of said gear, and in the opposite ends of which the bearing units 23, 24 are fitted with oil sealing rings 58 fitted in said ends, and a flange 59 on one end of said section suitably fixed to the crankcase 2 at the front end of the latter. A cap ring 60 threaded onto the front end of said section 57 retains the parts in said section therein. As will be clear, the hub 21 of the gear 19 extends out of said section 57 for the previously described connection of the runner 18 thereto. Angular bracket arms, as at 61, extending from the section 57, across the fluid coupling 15, support a front end bearing housing section 62 for the fly wheel 9 and in which a roller bearing unit 63 is fitted and retained by a cap 64 threaded into said section 62. The bearing unit 63 also functions to support the front end of the crank shaft 6, as will be clear. A branch housing section 65 for the gear 20 extends radially from the section 57 with a central, annular socket 66 therein in which the bearing unit 27 is fitted and supported. A tubular section 67 with a lateral offset section 68 extends from one side of the section 65 and surrounds the ring gear 26, shaft 29, gears 52, 47, 48, 49, 50 and the differential casing 32. The beforementioned bearing units 33, 34 for said casing 32 are fitted in said section 67, and the bearings 46 for the shaft 45 form part of said section 68.

Oil seals are provided at appropriate places in the drive, for instance, a sealing ring 69 between the rear end of the hub 21 and the front end 6 of the crankshaft 3, and a sealing bushing 70 and hub flange 71 between the rear side of the casing 16 and the runner 18. A retaining ring 72 is provided on the hub 25 of the gears 20 for the bearing unit 27.

As shown in Figure 1, the wheel-driving shafts 13, 14 may be those of the front wheels 73 of an automobile, whereas, as shown in Figure 2, said shafts 13, 14 may be those of the rear wheels 74. In either event, by virtue of the described arrangement of parts, the motor 1 is disposed with the crank shaft substantially parallel with the wheel-driving shafts. Thus, as illustrated, my invention provides a transverse drive for either the front or the rear wheels of an automobile. As will be understood, the motor 1 may be mounted in any suitable manner on the chassis, not shown, of the vehicle.

Referring now to the operation of the described drive, the crank shaft 3 of the motor 1 drives the reduction gears 19, 20, through the medium of the fluid coupling 15, to impart rotation to the ring gear 26 oppositely, relative to the direction of rotation of said crank shaft 3, and at a reduced ratio of speed. Rotation of the ring gear 26, through the medium of the gear 47, imparts rotation to the stub shaft 45 and the low speed gear 48 and the reversing gear 49. With the shiftable gear 52 in neutral, as shown, the motion-transmitting shaft 29 and the wheel-driving shafts 13, 14 are stationary. By shifting the shiftable gear 52, toward the left in Figure 3, to mesh the internal gear section 53 of the shiftable gear 52 with the clear edge of the ring gear 26, a direct high speed drive is established from said ring gear 26 to the motion-transmitting shaft 29 and the differential casing 32, whereby, through the medium of the differential gear pinions 38 and the gears 35, 36, the wheel-driving shafts 13, 14 are driven at high speed in the same direction as the motion-transmitting shaft 29, which is to say oppositely relative to the direction of rotation of the crank shaft 3 of the motor 1. Obviously, differential rotation of the wheel-driving shafts 13, 14 may take place in the usual manner. By shifting the shiftable gear 52 from neutral position, shown in Figure 3, to the right and into mesh with the low speed gear 48, low speed drive of the wheel-driving shafts 13, 14 is imparted thereto, in the same direction as under high speed drive, and through the medium of the ring gear 26, the gears 47, and the shaft 45. As will be clear, in low speed driving, the ring gear 26, gears 47 and 48, and the shiftable gear 52 provide a second reduction gear train between the gear 20 and the motion-transmitting shaft 29. By shifting the shiftable gear 52 into mesh with the idler pinion 50, reverse drive is imparted to the wheel-driving shafts 13, 14 through a gear train comprising the ring gear 26, gears 47 and 49, idler gear 50 and the shiftable gear 52.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. The combination with the crank shaft of an internal combustion engine, of a pair of wheel-driving shafts arranged end to end, a differential between the ends of said shafts including a rotatable casing operative to impart rotation to said shafts, a fluid coupling operative by the crank shaft, and means operative by said coupling to rotate said casing at variable speeds selectively comprising a reduction gear train, and mechanism for establishing a direct drive between one gear of said train and said casing comprising a hollow motion-transmitting shaft surrounding one of said wheel-driving shafts and operatively connected to said casing, a ring gear rotatable around the motion-transmitting shaft and fast to one gear of said train, and a shiftable gear splined on the motion-transmitting shaft and including an internal gear section for meshing with the ring gear.

2. The combination with the crank shaft of an internal combustion engine, of a pair of wheel-driving shafts arranged end to end, a differential connecting the ends of said pair of shafts and rotatable to drive the shafts of said pair, means to rotate said differential at variable speeds in one direction selectively, comprising a hollow motion-transmitting shaft rotatable around one of the shafts of said pair and operatively connected to said differential, a fluid coupling operative by said crank shaft, a reduction gear train operative by said coupling, a ring gear rotatable around the motion-transmitting shaft and fast to one gear of said train, reduction gearing operative by said ring gear constantly, and a shiftable gear splined on said motion-transmitting shaft, said shiftable gear being shiftable in one direction to mesh with said ring gear and in the opposite direction to mesh with one of the gears of said reduction gearing.

3. The combination with the crank shaft of an internal combustion engine, of a pair of wheel-driving shafts arranged end to end, a differential connecting the ends of said pair of shafts, and rotatable to drive the shafts of said pair, means to rotate said differential at variable speeds in one direction selectively, comprising a hollow motion-transmitting shaft rotatable around one of the shafts of said pair and operatively connected to said differential, a fluid coupling operative by said crank shaft, a reduction gear train operative by said coupling, an externally toothed ring gear rotatable around the motion-transmitting shaft and fast to one gear of said train, reduction gearing operative by said ring gear constantly, and a shiftable gear splined on said motion-transmitting shaft, said shiftable gear being shiftable in one direction to mesh with said ring gear and in the opposite direction to mesh with one of the gears of said reduction gearing, and reversing gearing operative by said reduction gearing, said shiftable gear being shiftable into mesh with a gear of said reverse gearing.

CHARLES N. ARONSON.

REFERENCES CITED

The following references are of record in the file of this patent:

UNITED STATES PATENTS

| Number | Name | Date |
| --- | --- | --- |
| 1,048,076 | Hunt | Dec. 24, 1912 |
| 1,630,210 | Olson | May 24, 1927 |
| 2,054,877 | Eastman | Sept. 22, 1936 |
| 2,123,005 | Ford | July 5, 1938 |
| 2,164,096 | Tjaarda | June 27, 1939 |
| 2,294,994 | Maze | Sept. 8, 1942 |